July 26, 1932.  W. L. BEALL  1,868,516
DISPENSING MECHANISM
Filed Dec. 20, 1929

Inventor
William L. Beall
By H. P. Doolittle
Atty.

Patented July 26, 1932

1,868,516

UNITED STATES PATENT OFFICE

WILLIAM L. BEALL, OF CHATTANOOGA, TENNESSEE, ASSIGNOR TO INTERNATIONAL HARVESTER COMPANY, A CORPORATION OF NEW JERSEY

DISPENSING MECHANISM

Application filed December 20, 1929. Serial No. 415,397.

This invention relates to a dispensing device of a type particularly adapted for fertilizer distributors. More particularly, the invention relates to a fertilizer distributor of the vibrating type.

The object of the invention is to construct an improved fertilizer distributor in which the vibrating part of the device is adapted to be operated by a horizontal ratchet wheel.

Another object is to movably hinge the hopper and its associated operating mechanism so that it may be readily removed for substitution of other devices, such as the planter described in my copending application Serial No. 385,712, filed August 14, 1929.

I accomplish these objects and others, which will be apparent, by the construction and organization illustrated in the drawing and described in the following detailed description.

Figure 1:
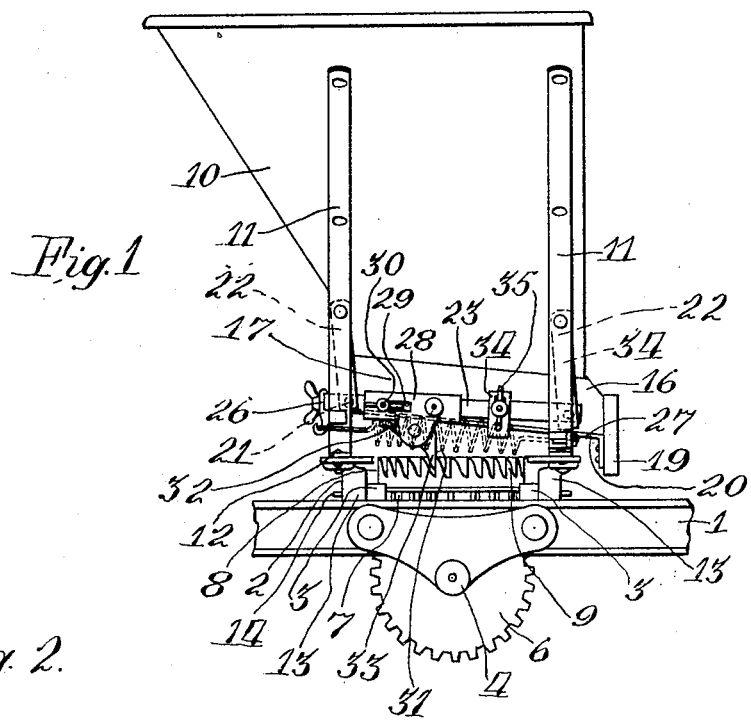
Figure 1 is a side elevation, showing the dispensing device of this invention embodied in a fertilizer distributor and such parts of the supporting frame and driving mechanism as are necessary to illustrate the operation of the device.

In the drawing the bars 1 are side members of a supporting frame, not shown. A hopper supporting base 2 is mounted above and rests on the frame side members 1. The base 2 is provided with hooked extensions 3 adapted to serve as hinging brackets for the hopper, as will hereinafter be described. Bearing blocks 4 are suitably supported by the frame side members 1. A crank shaft 5 is carried by the bearing blocks 4 and carries a gear 6 which operatively engages a horizontal gear 7 mounted for rotation on the hopper base 2. A ratchet wheel 8 is rigidly secured to the gear 7 for rotation therewith. Upstanding ratchet teeth 9 are spaced around the periphery of the ratchet wheel.

Figure 2:
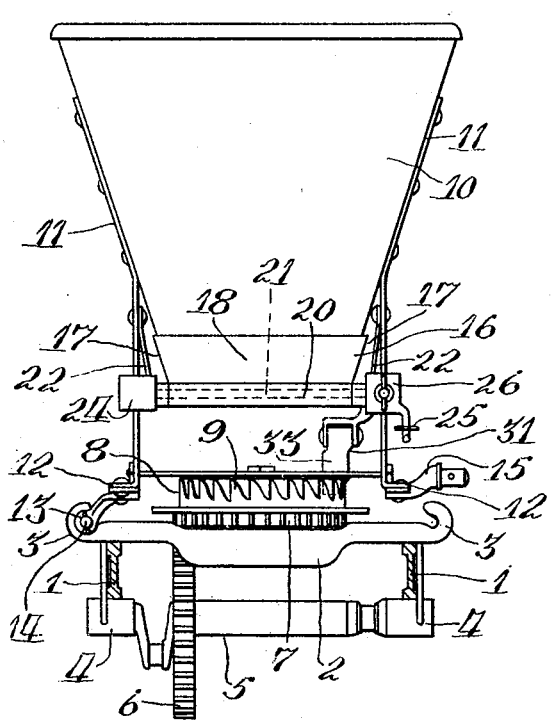
Figure 2 is a rear end view of the distributor shown in Figure 1.
Figure 3:
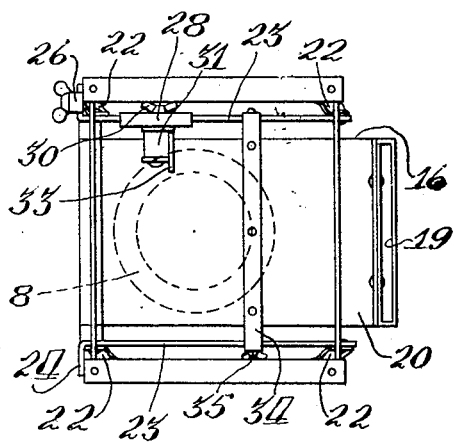
Figure 3 is a plan view taken in an upward direction from the bottom of the hopper.

A hopper 10 is mounted on a frame comprising upright bars 11 rigidly secured to the hopper at their upper ends. The bars 11 have right angled extensions 12 at the bottom. On one side, the extensions 12 are secured to a hinge 13. A hinge rod 14 passes through the hinge 13 and operatively engages the hooked extensions 3 on one side of the hopper supporting base. On the other side of the hopper, the extensions 12 are secured to a tilting arm 15 which is a part of a hopper tilting mechanism described and claimed in my copending application Serial No. 385,713, filed August 14, 1929. A discharging chute 16 is mounted for reciprocating movement of a vibrating nature below the hopper 10. The sides 17 of the delivery chute are flared, as shown in Figure 2, and extend upwardly in overlapping relation, but freely movable, with respect to the hopper side walls. The rear end wall 18 of the delivery chute is spaced from the corresponding wall of the hopper a sufficient distance to allow for the reciprocating movement of the chute. The front end of the chute is provided with a downwardly extending delivery outlet 19 communicating with the inside of the delivery chute. The delivery outlet 19 is spaced sufficiently from the front wall of the hopper to allow for the required reciprocating motion. A bottom plate 20 has a right-angled extension engaging the downwardly extending delivery outlet 19 and a substantially horizontal portion forming the bottom of the delivery chute. At the rear the plate 20 is shaped to engage a pin 21, which extends laterally beyond the sides of the chute to form a rear end support for the chute, as will be hereinafter described.

At points somewhat above the bottom of the hopper links 22 are pivoted to the uprights on a horizontal axis. The links are bent inwardly, as shown in Figure 2, to clear the uprights during oscillating movement. The links at the rear of the delivery chute 16 engage the side extensions of the pin 21, which forms pivots. This construction permits a reciprocating motion of the delivery chute. Longitudinally extending side bars 23, also pivoted on the extensions of the pin 21, extend forwardly and are pivotally connected to the front links 22.

The rear ends of the side bars 23 are provided with lateral extensions 24, which abut against the rear uprights 11 when the chute is in its forward position. A tension spring 25 is secured by a bracket 26 to one of the lateral extensions 24 at the rear and by a suitable attaching means 27 to one of the uprights 11 at the forward end of the hopper support.

A bracket 28 is secured to one of the delivery chute side bars 23. The bracket 28 is provided with longitudinally extending slots 29 and is secured by bolts 30 positioned in the slots. An L-shaped ratchet pawl 31 is pivotally mounted on the bracket 28 on a horizontal axis. One leg 32 of the ratchet pawl extends horizontally adjacent the bracket. The other leg 33 extends downwardly and is provided with a vertical plain face on the forward side and a curved cam face on the rearward side. The ratchet pawl 31 extends into the path of the ratchet teeth 9 on the ratchet wheel 8. The ratchet teeth 9 are provided with a plain vertical face on the rearward side, to engage the similar face on the downward extension of the ratchet pawl. The ratchet teeth 9 are also provided with a curved cam face on the forward side for a purpose to be hereinafter described.

The forward end of the delivery chute is adjustably supported in position by a yoke 34, which extends beneath the bottom of the chute and upwardly at each side across the delivery bars 23. The upward extensions of the yoke are slotted and suitable securing clamps 35 are used to fasten the upward extensions to the side members 23.

The operation of the device of this invention is substantially the same as the well known vibrating distributors. Material to be dispensed or distributed, such as fertilizer, placed in the hopper rests on the chute at the bottom.

The crank shaft 5 with its attached gear is rotated by suitable connecting rods or other means, thereby rotating the gear 7 and the attached ratchet wheel 8. When the ratchet wheel is turned in the operative direction, the flat, vertical faces of the ratchet teeth 9 engage the downwardly extending leg 33 of the ratchet pawl. The delivery chute is moved to the rear against the tension of the spring 25 with a substantially horizontal motion. As the engaged tooth on the ratchet wheel moves around its radius, it becomes disengaged from the ratchet pawl. The spring 25 jerks the delivery chute forward until the extensions 24 abut the rear hopper supports 11. This vibratory motion dispenses or delivers a predetermined amount of fertilizer to the front of the delivery chute 16 and out of the delivery outlet 19.

In order to secure the proper reciprocating motion of the delivery chute to obtain the desired rate of discharge, the bracket 28 may be adjusted longitudinally of the delivery chute, altering the engagement of the ratchet pawl 31 with the ratchet wheel 8. Also, as a further adjustment of the operation of the device and the amount of material discharged, the front of the delivery chute may be adjusted vertically by loosening the securing clamps 35 and sliding the supporting yoke 34 vertically with respect to the side members 23.

It is to be understood that the device shown is only one embodiment of the invention and that applicant limits his invention only by the scope of the appended claims.

What is claimed is:

1. A distributing device comprising a frame, a hopper removably hinged to said frame, a delivery chute pivotally mounted on the bottom of said hopper for horizontal reciprocation, means for urging said delivery chute in one direction, an abutment positioned to limit the movement in said direction, a ratchet wheel below the chute and mounted a ratchet wheel below the chute and mounted on the frame, the teeth on said wheel being positioned in spaced relation around the periphery of the wheel, a pivoted ratchet dog depending downwardly from the chute into engagement with said ratchet teeth, said ratchet dog being mounted to give the chute horizontal reciprocating motion upon rotation of the ratchet wheel in one direction and so pivoted to permit its disengagement with the ratchet teeth when the ratchet wheel is moved in the reverse direction.

2. A distributing device comprising a frame, a hopper mounted on said frame, a delivery chute pivotally mounted at the bottom of said hopper for horizontal reciprocation, a tension spring for urging said delivery chute in a forward direction, an abutment positioned to limit the movement in said direction, a ratchet wheel below the chute and mounted on the frame, the teeth on said wheel being vertically upstanding and positioned in spaced relation around the periphery of the wheel, a pivoted ratchet pawl depending downwardly from the chute into engagement with said ratchet teeth, said ratchet pawl being mounted to give the chute horizontal reciprocating motion upon rotation of the ratchet wheel in one direction and so pivoted to permit disengagement with the ratchet teeth when the ratchet wheel is moved in the reverse direction.

In testimony whereof I affix my signature.

WILLIAM L. BEALL.